US006959757B2

(12) United States Patent
Otter

(10) Patent No.: US 6,959,757 B2
(45) Date of Patent: Nov. 1, 2005

(54) BLACK LAYER COATED HEAT EXCHANGER

(75) Inventor: James W. Otter, Fairfield Glade, TN (US)

(73) Assignee: Carrier Corporation, Syracuse, NY (US)

( * ) Notice: Subject to any disclaimer, the term of this patent is extended or adjusted under 35 U.S.C. 154(b) by 0 days.

(21) Appl. No.: 10/447,101

(22) Filed: May 28, 2003

(65) Prior Publication Data
US 2003/0196782 A1 Oct. 23, 2003

Related U.S. Application Data

(63) Continuation-in-part of application No. 09/927,274, filed on Aug. 10, 2001.

(51) Int. Cl.[7] .............................................. F28F 13/18
(52) U.S. Cl. ...................... 165/133; 165/154; 165/904
(58) Field of Search ................................ 165/133, 904

(56) References Cited

U.S. PATENT DOCUMENTS 2,167,378 A * 7/1939 Shoemaker et al. .......... 174/24
3,818,984 A * 6/1974 Nakamura et al. .......... 165/166
4,330,344 A * 5/1982 Terai et al. .................. 428/336
4,559,998 A * 12/1985 Counterman ............. 165/109.1

FOREIGN PATENT DOCUMENTS

| JP | 57188964 A | * 11/1982 | ............... F24J 3/02 |
| JP | 59-7893 A | * 1/1984 | ........... F28F 13/18 |
| JP | 59134496 A | * 8/1984 | ........... F28F 13/18 |
| JP | 63267889 A | * 11/1988 | ............. F28D 9/00 |

OTHER PUBLICATIONS

Translation of Kokai JP 59-007893A.*

* cited by examiner

*Primary Examiner*—Allen J. Flanigan
(74) *Attorney, Agent, or Firm*—Carlson, Gaskey & Olds

(57) ABSTRACT

Hot combustion products exchange heat with air in a heat exchanger of a condensing furnace. The hot combustion products flow on one side of the heat exchanger, and the air flows on the opposing side of the heat exchanger. The heat exchanger is electrochemically coated with a coating of copper metal. The copper coating is oxidized with an aqueous oxidizing alkaline solution to form a matte black layer of cupric oxide. As the layer of cupric oxide is black, the layer has a high emissivity and emits more heat, increasing the efficiency of the primary heat exchanger. Alternatively, iron can be electrochemically coated on the primary heat exchanger and oxidized to black magnetite to increase emissivity.

8 Claims, 2 Drawing Sheets

BLACK LAYER COATED HEAT EXCHANGER

This application is a continuation in part of patent application Ser. No. 09/927,274 filed on Aug. 10, 2001.

BACKGROUND OF THE INVENTION

The present invention relates generally to a heat exchanger for use with the primary heat exchanger of a condensing furnace or the single heat exchanger of a mid-efficiency furnace which includes a layer of oxidized black coating which increases the emissivity of the heat exchanger and allows the heat exchanger to emit more heat.

A condensing furnace generally includes two heat exchangers, a primary heat exchanger and a condensing heat exchanger. Air and natural gas enter a burner where they are burned to form hot combustion products. The primary heat exchanger cools the hot combustion products, extracting and supplying heat to the air that is to be heated. A standard ("mid-efficiency") furnace generally includes only a single heat exchanger which cools the hot combustion products, extracting and supplying heat to the air to be heated.

These heat exchangers are commonly formed of a shiny aluminized steel. As the aluminized steel is shiny, the steel does not radiate heat well and has a low emissivity. Emissivity is the ability of a surface to emit heat by radiation. For example, black bodies have a higher emissivity than lighter bodies and are therefore able to emit more heat by radiation than lighter bodies.

There are several drawbacks to the aluminized steel heat exchanger of the prior art. For one, aluminized steel is expensive. Additionally, as the aluminized steel has a low emissivity, the steel does not radiate heat well.

Hence, there is a need in the art for a furnace heat exchanger which increases the emissivity of the heat exchanger and allows the heat exchanger to emit more heat.

SUMMARY OF THE INVENTION

The present invention relates to a furnace heat exchanger for use with a primary heat exchanger of a condensing furnace or a single heat exchanger of a mid-efficiency furnace which includes a layer of oxidized black coating which increases the emissivity of the heat exchanger and allows the heat exchanger to emit more heat.

In the furnace heat exchanger, hot combustion products from a burner exchange heat with air, heating the air The hot combustion products flow on one side of the primary heat exchanger, and the air flows on the opposing side of the primary heat exchanger. The heated air is employed to heat an enclosed space, such as a room.

The furnace heat exchanger is made of steel alloy or metal-coated steel and is electrochemically coated with copper metal. An aqueous solution of an oxidizing alkaline inorganic compound oxidizes the copper, producing a black matte layer of cupric oxide (CuO).

As the cupric oxide layer is black, the layer has a high emissivity and emits more heat, increasing the efficiency of the heat exchanger. Also, as cupric oxide has a high decomposition temperature, the cupric oxide is not affected by the flame of the burner which may contact part of the heat exchanger. It is preferable that cupric oxide be coated on both sides of the heat exchanger to further increase efficiency.

Alternatively, the furnace heat exchanger is formed of a steel alloy and is controllably oxidized to form a black coating of magnetite ($Fe_3O_4$) which increase the emissivity of the heat exchanger.

Accordingly, the present invention provides a furnace heat exchanger which includes a layer of oxidized black coating which increases the emissivity of the heat exchanger and allows the heat exchanger to emit more heat.

These and other features of the present invention will be best understood from the following specification and drawings.

BRIEF DESCRIPTION OF THE DRAWINGS

The various features and advantages of the invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
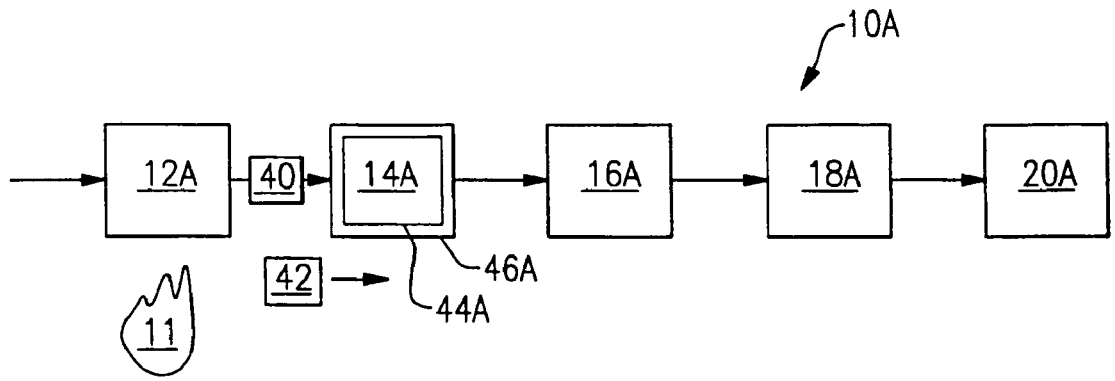
FIG. 1 illustrates a schematic diagram of a condensing furnace system.

FIG. 1 schematically illustrates a condensing furnace system 10A. Air and natural gas enter a burner 12A which burns the air and natural gas by a flame 11 to produce hot combustion products 40. The hot combustion products 40 pass through a primary heat exchanger 14A, which cools the hot combustion products 40 and extracts heat to the air 42 to be heated. The air 42 to be heated and the hot combustion products 40 exchange heat in the primary heat exchanger 14A. The air 42 in the primary heat exchanger 14 accepts heat from the hot combustion products 40, heating the air 42. The hot combustion products 40 flow on one side 44A of the primary heat exchanger 14A, and the air 42 flows on an opposing side 46A of the primary heat exchanger 14. For example, as illustrated in FIG. 1, the hot combustion products 40 flow inside the primary heat exchanger 14A and the air 42 flows outside the primary heat exchanger 14A. However, it is to be understood that the hot combustion products 40 can flow outside the primary heat exchanger 14A and the air can flow inside the primary heat exchanger 14A. To increase the efficiency of the system 10A, a condensing heat exchanger 16 is used to extract additional heat. As the hot combustion gases pass through the condensing heat exchanger 16A, the condensing heat exchanger 16A cools the combustion products to a temperature below the dewpoint of the combustion products. Water vapor begins to condense, allowing more heat to be extracted from the combustion products and increasing efficiency. As the liquid condensate condenses, heat is transferred from the water vapor to the air to be heated. An inducer fan 18A provides a source of suction on the condensing heat exchanger 16A and assists in pulling the flow of the combustion products through the system 1 GA. The combustion products are expelled from the system 10A through a flue 20A.

Figure 2:
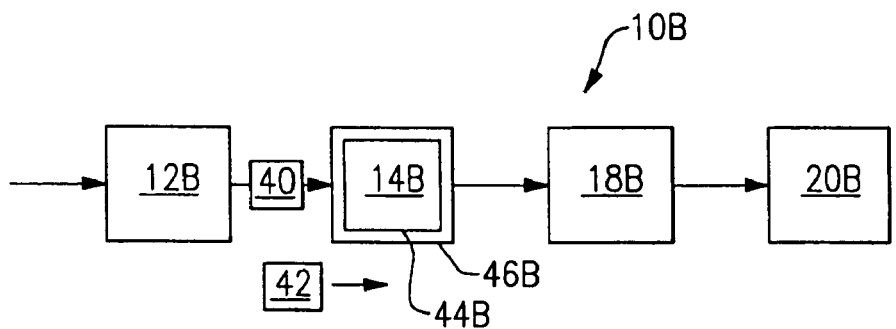
FIG. 2 illustrates a schematic diagram of a mid-efficiency furnace system.

FIG. 2 schematically illustrates a mid-efficiency furnace system 10B, which works similarly to the condensing furnace system 10A, but does not include a condensing heat exchanger 16A. Heat from the hot combustion products 40 produced by the burner 12B is extracted by the single heat exchanger 14B and supplied to the air 42 to be heated. The air 42 to be heated and the hot combustion products 40 exchange heat in the single heat exchanger 14B. The air 42 in the single heat exchanger 14B accepts heat from the hot combustion products 40, heating the air 42. The hot combustion products 40 flow on one side 44B of the single heat exchanger 14B, and the air 42 flows on an opposing side 46B of the single heat exchanger 14B. An inducer fan 18B provides suction on the combustion products which are expelled through flue 20B.

Figure 3:
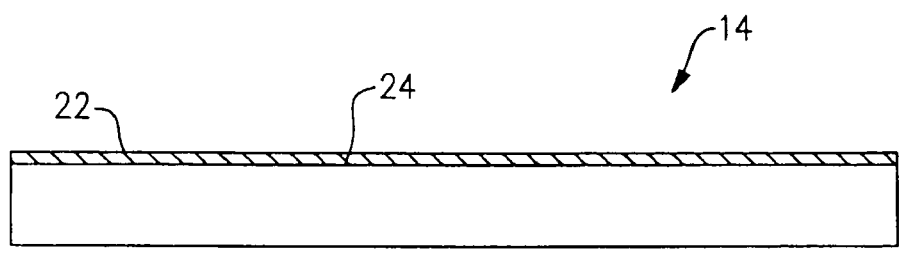
FIG. 3 illustrates a heat exchanger with a coating of copper electrochemically applied to the surface of the heat exchanger.
Figure 4:
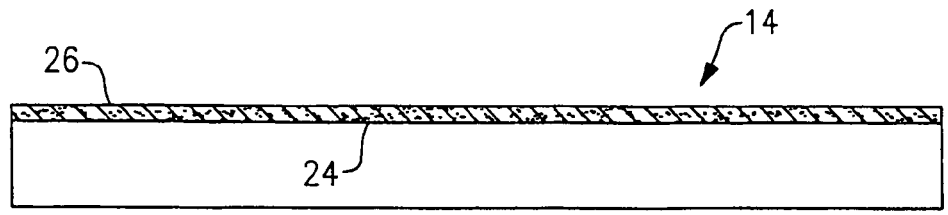
FIG. 4 illustrates a heat exchanger with a coating of cupric oxide.

As shown in FIG. 3, a coating of copper metal 22 is applied to a surface 24 of the heat exchanger 14 to assure adhesion. The heat exchanger 14 is either a primary heat exchanger 14A of a condensing furnace system 10A or a single heat exchanger 14B of a mid-efficiency system 10B. The heat exchanger 14 is made of either a steel alloy or a metal-coated steel. Preferably, the coating of copper metal 22 is electrochemically applied to the surface 24. However, it is to be understood that other suitable methods of attachment are possible, and one skilled in the art would know who to attach the copper metal 22 to the surface 24 of the heat exchanger 14. An aqueous solution of an oxidizing alkaline inorganic compound is applied to the coating of copper 22. An aqueous oxidizing alkaline solution contains an excess of hydroxide (OH$^-$) ions and an oxidizing compound. The hydroxide ions react with and oxidize the coating of copper metal 22, producing a layer of cupric oxide (CuO) 26, shown in FIG. 4. The heat exchanger 14 is either immersed in a bath of the aqueous oxidizing alkaline solution, or the solution is applied as a spray.

The eupric oxide layer 26 on the heat exchanger 14 is matte black. As black bodies emit more heat, the black cupric oxide coated heat exchanger 14 has a higher emissivity than the shiny aluminized steel heat exchanger of the prior art. Emissivity is the relative power of a surface to emit heat by radiation. As the cupric oxide layer 26 of the heat exchanger 14 is matte black, the heat exchanger 14 has a high emissivity and a greater ability to emit heat, increasing the ability of the heat exchanger 14 to heat the air 42.

Additionally, the cupric oxide has a melt or decomposition temperature of 1326° C. The decomposition temperature is the temperature at which the cupric oxide is affected or melted by heat. As the heat exchanger 14 does not reach a temperature of over 650° C., the cupric oxide layer 26 will not melt or decompose due the heat of the flame 11 of the burner 12 which may contact part of the heat exchanger 14.

As the matte black cupric oxide layer 26 has a high emissivity, the heat exchanger 14 is more efficient and can emit more heat. In a furnace where only a heat exchanger 14 is utilized, both the size of the heat exchanger 14 and the furnace can be reduced, reducing manufacturing costs. Alternatively, if the primary heat exchanger 14 remains the same size, the efficiency of the heat exchanger 14 is increased as there is a lower gas flue exit temperature. As the efficiency of the heat exchanger 14 is increased, the size of the condensing heat exchanger 16 can be reduced. This is advantageous as the material of the condensing heat exchanger 16 is expensive as it must be made resistant to corrosion.

Figure 5:
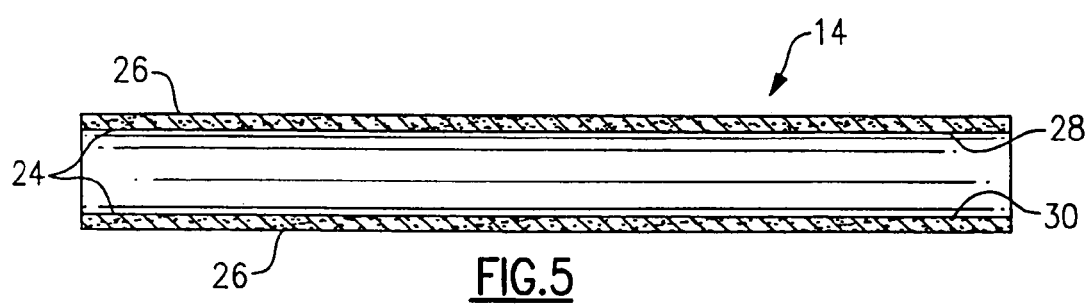
FIG. 5 illustrates a heat exchanger with a coating of cupric oxide on both the inner surface and the outer surface of the heat exchanger.

As shown in FIG. 5, efficiency can further be increased by coating both the inner surface 28 and the outer surface 30 of the heat exchanger 14 with cupric oxide. By coating both the inner surface 28 and the outer surface 30, the emissivity of the heat exchanger 14 is further increased, allowing for an additional increase in efficiency.

Figure 6:
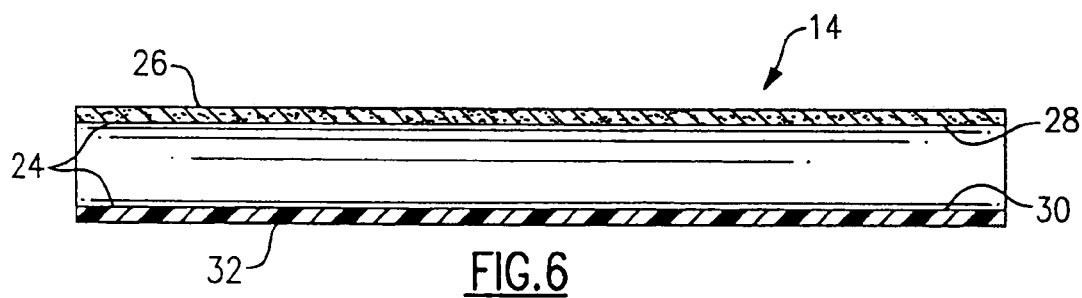
FIG. 6 illustrates a heat exchanger with a coating of cupric oxide on the inner surface and a coating a magnetite on the outer surface of the heat exchanger.

In an alternative embodiment, a heat exchanger 14 formed of a steel alloy is electrochemically coated with iron. The iron is controllably oxidized with an aqueous alkaline solution chemically formulated to form a black coating of magnetite ($Fe_3O_4$). It is preferable that magnetite only be utilized on the outer surface 30 of the heat exchanger 14 as heat from the flame of the heat exchanger 14 can oxidize the black magnetite on the inner surface 28 further and turn it red, lowering efficiency. In one embodiment, as shown in FIG. 6, a layer of magnetite 32 is utilized on the outer surface 30 of the heat exchanger 14 which is exposed to the environment and a layer of cupric oxide 26 is used on the inner surface 28 of the heat exchanger 14. The layer of magnetite 32 also has a high decomposition temperature and does not decompose or melt due to the heat of the condensing furnace system 10.

Figure 7:
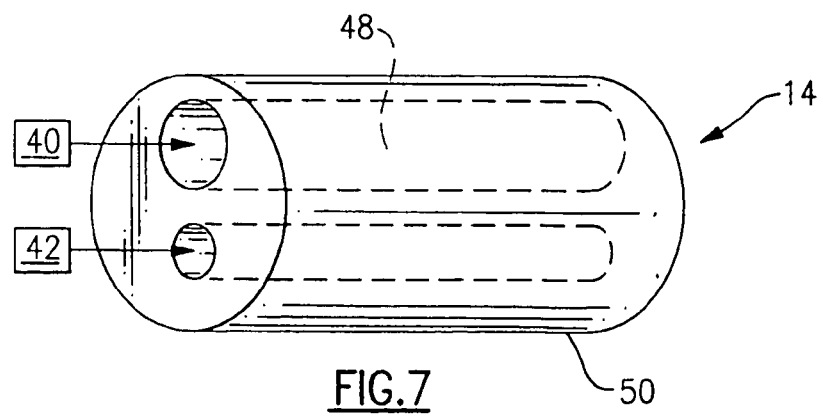
FIG. 7 illustrates the heat exchanger of the present invention as a shell and tube heat exchanger.

The heat exchanger 14 can be a plate heat exchanger, as shown in FIGS. 3–6, or a shell and tube heat exchanger, as shown in FIG. 7. In this example, the heat exchanger 14 includes a plurality of tubes 48 contained in a shell 50. The hot combustion products 40 flow through the inside of the plurality of tubes 48 and the air 42 to be heated flows around the plurality of tubes 48 in the shell 50. The hot combustion products 40 in the plurality of tubes 48 heat the air 42, which is used to heat a room or other enclosed space. Alternately, the air can flow through the plurality of tubes 48 and the hot combustion products 40 flow through the shell 50.

There are several advantages to using the black coated heat exchanger 14 of the present invention. For one, the aluminized steel heat exchanger of the prior art is shiny so it does not radiate heat well. As the matte black cupric oxide layer 26 on the heat exchanger 14 has a higher emissivity, the heat exchanger 14 can emit more heat and the efficiency of the heat exchanger 14 is increased. Finally, cupric oxide layer 26 is stable and does not decompose due to the high temperatures the heat exchanger 14 is exposed to.

Accordingly, the present invention provides a heat exchanger for a condensing furnace which includes a layer of an oxidized black coating which increases the emissivity of the heat exchanger and allows the heat exchanger to emit more heat.

The foregoing description is only exemplary of the principles of the invention. Many modifications and variations of the present invention are possible in light of the above teachings. The preferred embodiments of this invention have been disclosed, however, so that one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A furnace system comprising:
   a burner to generate hot combustion products;
   a first heat exchanger to exchange heat between said hot combustion products and air, said first heat exchanger including:
      a first surface and an opposing second surface; and
      a layer of dark material having a high emissivity applied on both said first surface and said second surface, and said hot combustion products flow over said first surface and said air flows over said second surface and exchanges heat with said hot combustion products, wherein said layer of dark material is cupric oxide; and
   a second heat exchanger to additionally cool said hot combustion products flowing from said first heat exchanger.

2. The heat exchanger as recited in claim 1 wherein said first heat exchanger is made of a steel alloy.

3. The heat exchanger as recited in claim 1 wherein said first beat exchanger is made of a metal coated steel.

4. The hear exchanger as recited in claim 1 wherein said first heat exchanger is a plate heat exchanger.

5. The heat exchanger as recited in claim 1 wherein said first heat exchanger is a shell and tube heat exchanger.

6. The heat exchanger as recited in claim 1 wherein said first heat exchanger is a primary heat exchanger.

7. The heat exchanger as recited in claim 1 wherein said hot combustion products flow inside said first hear exchanger and said air flows outside said first heat exchanger.

8. The heat exchanger as recited in claim 1 further including an inducer fan that draws said hot combustion products through the system.

\* \* \* \* \*